United States Patent

Kogure et al.

Patent Number: 5,363,896
Date of Patent: Nov. 15, 1994

[54] PNEUMATIC TIRE WITH REINFORCING LAYER EMBEDDED IN A DEFINED RUBBER

[75] Inventors: Tomohiko Kogure; Takao Muraki; Issey Nakakita, all of Hiratsuka, Japan

[73] Assignee: The Yokohama Rubber Co., Ltd., Tokyo, Japan

[21] Appl. No.: 73,489

[22] Filed: Jun. 9, 1993

[30] Foreign Application Priority Data

Jun. 19, 1992 [JP] Japan ................... 4-160841

[51] Int. Cl.⁵ .............................. B60C 15/06
[52] U.S. Cl. ........................ 152/543; 152/547
[58] Field of Search ........... 152/539, 542, 543, 546, 152/547, 565

[56] References Cited

U.S. PATENT DOCUMENTS

| | | |
|---|---|---|
| 3,052,275 | 9/1962 | Hylbert, Jr. ............ 152/543 |
| 3,298,417 | 1/1967 | Keefe, Jr. .............. 152/565 |
| 3,638,705 | 2/1972 | Devienne et al. ........ 152/543 |
| 4,023,608 | 5/1977 | Meiss . |
| 4,085,787 | 4/1978 | Maiocchi .............. 152/543 |
| 4,185,677 | 1/1980 | Motomura et al. ...... 152/546 |

FOREIGN PATENT DOCUMENTS

| | | |
|---|---|---|
| 0255105 | 10/1988 | Japan . |
| 3010914 | 1/1991 | Japan . |
| 4183615 | 6/1992 | Japan . |
| 2127361 | 4/1984 | United Kingdom . |
| 2160158 | 12/1985 | United Kingdom . |

Primary Examiner—Michael W. Ball
Assistant Examiner—Nancy T. Krawczyk
Attorney, Agent, or Firm—Nikaido, Marmelstein, Murray & Oram

[57] ABSTRACT

A pneumatic tire having a bead in which an end portion of a carcass layer is bent from an inner portion to an outer portion of the tire so as to be turned up around a bead core, a reinforcing layer which consists of reinforcing cords covered with coating rubber being provided so as to extend along a turnup portion of the carcass layer, the hardness of the coating rubber in the reinforcing layer is set in the range of JIS Hs 65-95.

6 Claims, 2 Drawing Sheets

PNEUMATIC TIRE WITH REINFORCING LAYER EMBEDDED IN A DEFINED RUBBER

BACKGROUND OF THE INVENTION

This invention relates to an improvement in a pneumatic tire provided with reinforcing layers in the beads, and more particularly to a pneumatic tire having improved casing rigidity (lateral rigidity of beads) which enables the steering stability of a vehicle to be improved.

As the performance of a vehicle has been improved to a higher level, a pneumatic tire with further improved steering stability has been demanded. To meet this demand, the casing rigidity-improving techniques have been used in practice for increasing the cornering force, by providing in addition to a bead filler a reinforcing layer, which consists of organic fiber cords or metal cords covered with coating rubber of a hardness of around JIS Hs 55–60, in a bead of a tire in such a manner that the reinforcing layer extends along a turnup portion of a carcass layer.

However, it has come to be demanded in recent years that the performance of a pneumatic tire with respect to the steering stability of a vehicle be further improved, and it has been proven that providing a reinforcing layer only in a bead as mentioned above serves to improve the lateral rigidity of the bead (widthwise rigidity of the tire) to only a limited extent. In order to further improve the performance of a pneumatic tire, an attempt to provide a multilayer reinforcing member in a bead has also been made but this causes the weight of the tire to increase, and, moreover, the number of manufacturing steps and the manufacturing cost increase. Therefore, providing a multilayer reinforcing member does not constitute a substantial solution to the problem.

SUMMARY OF THE INVENTION

An object of the present invention is to provide a pneumatic tire having an improved casing rigidity and an improved steering stability of a vehicle without increasing the weight of the tire in spite of the additional provision of a reinforcing layer in a bead.

To achieve this object, this invention provides a pneumatic tire having a carcass layer the end portions of which are turned up around bead cores from the inner side of the tire to the outer side thereof, and beads each of which is provided with a reinforcing layer extending along the relative turnup portion of the carcass layer and consisting of reinforcing cords covered with coating rubber, characterized in that the hardness of the coating rubber for the reinforcing layers is set in the range of JIS Hs 65–95.

Since the hardness of the coating rubber is thus set to a high level in the range of JIS Hs 65–95, the rigidity of the reinforcing layers in the beads in the present invention can be increased, so that the casing rigidity of the tire can be improved.

DESCRIPTION OF THE PREFERRED EMBODIMENTS

Figure 1:
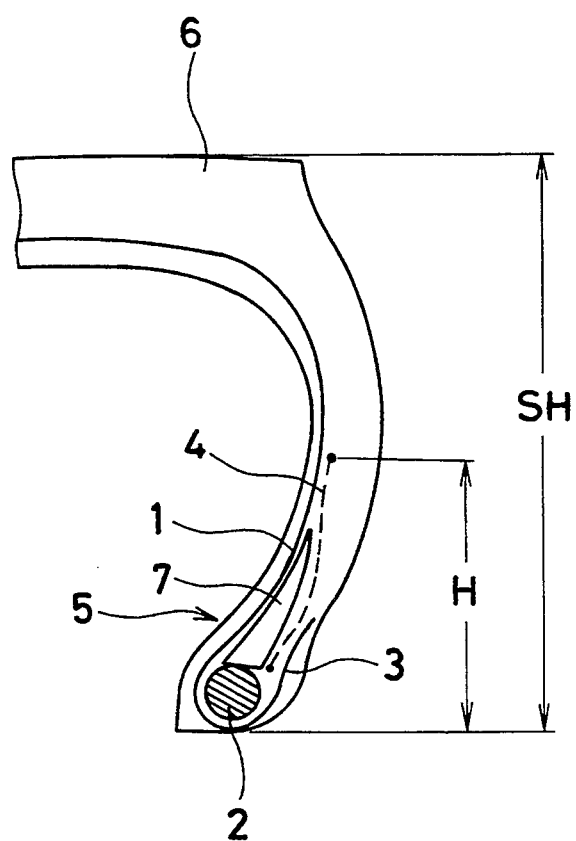
FIG. 1 is a halved longitudinal section of an example of the pneumatic tire according to the present invention.

In the pneumatic tire according to the present invention, an end portion of a carcass layer 1 is turned up around a bead core 2 in a bead 5 from the inner side to the outer side of the tire, and a reinforcing layer 4 is provided so as to extend along the axial outer side surface of a bead filler 7 provided on the axial inner side of a turnup portion 3, as shown in FIG. 1. A reference numeral 6 denotes a tread.

The reinforcing layer 4 is formed by arranging in a regularly spaced manner cords consisting of organic fiber cords, such as polyester fiber cords and aromatic polyamide fiber cords or metal cords, such as steel cords, and burying such cords in coating rubber.

Referring to FIG. 1, the relation between the height H of the reinforcing layer 4 and that SH of a cross section of the tire, i.e. a ratio H/SH is preferably in the range of 0.2–0.8, and a preferable angle of inclination of the cords in the reinforcing layer 4 with respect to the circumferential direction of the tire is in the range of 20°–90°. The heights H and SH represent heights measured in the radial direction of the tire on the basis of the position (bead base) of the tire which is opposed to the outer edge of a rim when the tire is fitted on the rim.

(1) According to the present invention, the hardness of the coating rubber for the reinforcing layer is set to JIS Hs 65–95, and preferably to JIS Hs 75–95.

It is preferable that the hardness of the coating rubber for the reinforcing layer 4 be not lower than that of a bead filler. When the hardness of the coating rubber for the reinforcing layer 4 is thus set to JIS Hs 65–95, the shearing resistance among the cords in the reinforcing layer 4 increases, so that the rigidity of the reinforcing layer 4 increases. This causes the lateral rigidity of the bead to increase, and enables the steering stability of a vehicle to be improved.

However, when the hardness of the coating rubber is lower than JIS Hs 65, the lateral rigidity of the bead cannot be improved, and, when this hardness exceeds 95, the coating rubber becomes too hard, and the production of a reinforcing layer 4 becomes difficult. The hardness JIS Hs is usually measured at room temperature (18°–22° C.) and the hardness referred to in this specification is also JIS Hs at room temperature. The hardness of the rubber (rubber composition) of the peripheral portion of the reinforcing layer is in the range of JIS Hs 55–60 just as is the case with a conventional pneumatic tire.

The coating rubber referred to above is a rubber composition to be exact, which consists of rubber, such as natural rubber (NR) and styrene-butadiene copolymer rubber (SBR) with which a compounding ingredient, such as carbon black, sulfur and a vulcanization accelerator is mixed.

(2) In the reinforcing layer 4 which is buried in the coat rubber of a hardness referred to in the paragraph (1) above, and which is used in the present invention, it is preferable that a ratio of the diameter d of a cord therein to the thickness g thereof be set to g/d=1.45–4.0.

Figure 2:
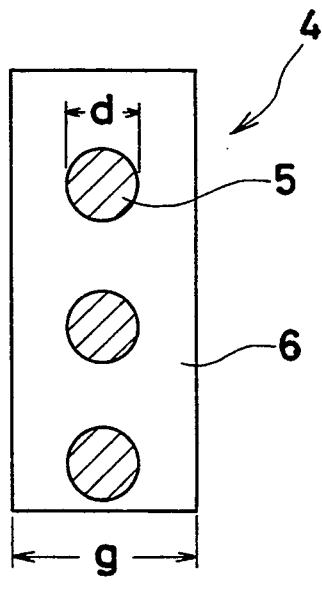
FIG. 2 is a sectional view of an example of a reinforcing layer in a bead of the pneumatic tire according to the present invention.

As shown in FIG. 2, the reinforcing layer 4 is formed by burying cords 5 in the coating rubber b. Although the g/d is generally set to around 1.2–1.4, it is preferable in the present invention using coating rubber of a high hardness that the g/d be set to 1.45–4.0 which is higher than the g/d in the conventional tire. When the g/d is thus increased, the reinforcing effect (casing rigidity) is further improved. The reasons reside in that the coating rubber 6 displays the same effect as the bead filler 7 in addition to the reinforcing effect owing to the rigidity of the cords 5, in proportion to the thickness of the reinforcing layer. According to the present invention, the g/d is more preferably set in the range of 1.7–3.0. When the g/d is set in this range, the coating rubber 6 displays the same reinforcing effect as the bead filler, so that the lateral rigidity of a bead can be further improved.

However, when the g/d is lower than 1.45, any more reinforcing effect cannot be expected even if the hardness of the coating rubber 6 is increased. When the g/d exceeds 4.0, a clearance occurs between an end portion of the reinforcing layer 4 and another part during the manufacture of a tire, and a manufacturing failure tends to occur.

Figure 3:
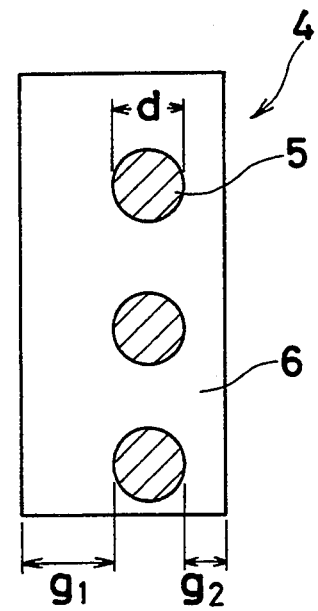
FIG. 3 is a sectional view of another example of a reinforcing layer in a bead of the pneumatic tire according to the present invention.

(3) In a reinforcing layer 4 according to the present invention which is buried in the coating rubber of the hardness mentioned in the paragraph (1) above, or in a reinforcing layer 4 according to the present invention which has g/d=1.45–4.0 as mentioned in the paragraph (2) above, the thickness $g_1$ of the portion of the coating rubber which is between a cord 5 and the corresponding axial inner edge of the reinforcing layer 4 and that $g_2$ of the portion of the coating rubber which is between the cord 5 and the corresponding axial outer edge of the reinforcing layer 4 are set to be different as shown in FIG. 3, and this difference $\beta$ is preferably set to $\beta = g_1 - g_2 = 0.1 - 2.5$ mm (0.1 mm $\leq \beta \leq$ 2.5 mm).

Namely, the reinforcing layer 4 is formed by arranging the cords 5 therein so that the cords 5 are close to the axial outer surface of the tire, whereby the cords 5 in the reinforcing layer 4 are spaced to as great an extent as possible from the center of deformation (neutral axis of bend) of the bead toward the axial outer surface of the tire with respect to the bend of the bead. This enables the lateral rigidity of the bead to be further improved. This is based on the fact that, as the cords 5 in the reinforcing layer 4 are in the positions farther away from and on the axial outer side of the neutral axis of bend of the bead in a tire, the reinforcing effect of the layer 4 increases. When a tire rolls with a certain slip angle, a tread surface is deformed axially, and a deviation of the tread surface from a rim constitute resistance which minimizes the displacement of a bead filler and a reinforcing layer 4. When the cords 5 in the reinforcing layer 4 are arranged with respect to the bend of the bead so that the cords 5 are spaced to as great an extent as possible from the center of deformation of the bead toward the axial outer edge of the tire, the reinforcing effect of the layer 4 increases. To obtain such an increased reinforcing effect, the cords 5 in the reinforcing layer 4 may be put aside toward the axial outer side of the tire as shown in FIG. 3. Concretely speaking, the relation $\beta$ between the thickness $g_1$ of the portion of the coating rubber 6 in the reinforcing layer 4 which is in the inner side portion of the tire and that $g_2$ of the portion of the coating rubber 6 which is in the outer side portion of the tire may be set to $\beta = g_1 - g_2 = 0.1 - 2.5$ mm, and preferably to 0.2–1.0 mm. However, when $\beta$ exceeds 2.5 mm, the thickness of the reinforcing layer becomes too large and a manufacturing failure tends to occur.

Figure 4:
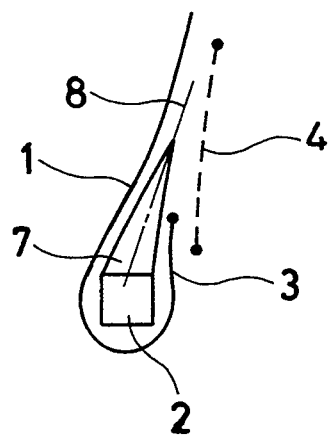
FIG. 4 illustrates a principal portion of an example of a bead of the pneumatic tire according to the present invention.
Figure 5:
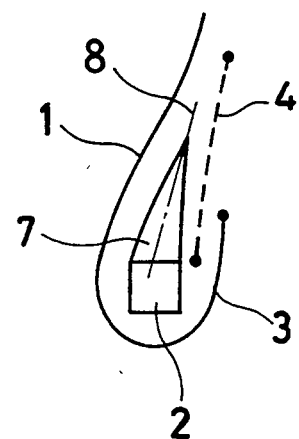
FIG. 5 illustrates a principal portion of another example of a bead of the pneumatic tire according to the present invention.

(4) Moreover, according to the present invention, the reinforcing layer 4 buried in coating rubber of the hardness mentioned in the paragraph (1) above, the reinforcing layer 4 in which g/d=1.45–4.0 as mentioned in the paragraph (2) above, and the reinforcing layer in which is set to $\beta = g_1 - g_2 = 0.1 - 2.5$ mm as $\beta$ mentioned in the paragraph (3) above may be provided in the portion of a tire which is on the axial outer side of a center line 8 (neutral axis of bend) of a filler 7 provided on the tread side of a bead core 2 as shown in FIG. 4 or 5. Namely, the reinforcing layer 4 may be provided on the axial outer side of a bead filler 7.

In the embodiment of FIG. 4, the reinforcing layer 4 is provided on the axial outer side of the bead filler 7 and on the axial outer side of the turnup portion 3 of the carcass layer 1. In the embodiment of FIG. 5, the reinforcing layer 4 is provided on the axial outer side of the bead filler 7 and on the axial inner side of the turnup portion 3.

The reinforcing layer 4 is provided in this manner for the same reasons as are given in the paragraph (3) above. Namely, the lateral rigidity of a bead can be improved by providing a reinforcing layer 4 in the portion of a tire which is on the axial outer side of the neutral axis of bend of a bead.

The pneumatic tire according to the present invention described above is suitable as a pneumatic radial tire for passenger cars.

Some embodiments of the present invention will now be described.

EXAMPLE 1

Five different types of tires (Tires 1–3 according to the present invention, Conventional tire 1 and Comparative tire 1) having a tire size of 175/70R13, cords of nylon 840 d/2 of 0.55 mm in diameter d as the cords in a reinforcing layer 4, an angle of inclination of these cords with respect to the circumferential direction of the tire of 55°, thickness (gauge) g of the reinforcing layer of 0.70 mm, a ratio g/d of 1.3, a constant height H of the reinforcing layer 4 of 0.5 × Hs, and different JIS Hs hardnesses shown in Table 1 of coating rubber were manufactured.

The construction of the other parts, such as a carcass layer and a belt layer in each tire and the manufacturing conditions were in accordance with those in a conventional tire, and a detailed description thereof is omitted.

The lateral rigidity of the beads in these pneumatic tires evaluates by the following method using rims of 13 × 5J, air pressure in the tires of 200 KPa and a load of 3432N is shown in Table 1 with the types of tires and hardness of the coating rubber.

Lateral rigidity evaluating method

After a load of 3432N was imparted to a tire, the tire was moved horizontally by 5.0 mm and 10.0 mm, and the respective lateral loads $L_5$ and $L_{10}$ were measured. The lateral rigidity was determined in accordance with $(L_{10} - L_5)/5$, and the result was shown by an index (an index of 100 is used as a base index which represents the lateral rigidity of the beads in the Conventional tire 1, and the larger indexes show higher lateral rigidities).

TABLE 1

| Type of tire | Hardness of coating rubber (JIS Hs) | Lateral rigidity |
| --- | --- | --- |
| Conventional tire 1 | 60 | 100 |
| Tire 1 according to the present invention | 65 | 103 |
| Tire 2 according to the present invention | 75 | 110 |
| Tire 3 according to the present invention | 95 | 115 |
| Comparative tire 1 | 63 | 100 |

As is clear from the results shown in Table 1, the lateral rigidity of a bead is improved greatly by using coating rubber of a hardness JIS Hs of not lower than 65 for a reinforcing layer 4.

EXAMPLE 2

Eight types of tires (Tires 4–7 according to the present invention and Comparative tires 2–5) having the same size as the tires manufactured in Example 1, and various hardnesses (JIS Hs) of the coating rubber, diameters d of the cords, thicknesses g of the reinforcing layers and ratios g/d, and different kinds (a: nylon 840 d/2, b: steel 1×2) as shown in Table 2 were manufactured. The lateral rigidity of the beads of these tires was determined, and the results are shown in Table 2.

The height H of the reinforcing layers in all the tires was set to 0.5×SH.

TABLE 2

| Type of tire | Hardness of coating rubber (JIS Hs) | d (mm) | g (mm) | g/d | Kind of cord material | Lateral rigidity |
| --- | --- | --- | --- | --- | --- | --- |
| Tire 4 according to the present invention | 75 | 0.55 | 0.80 | 1.45 | a | 114 |
| Comparative tire 2 | 63 | 0.55 | 0.70 | 1.30 | a | 100 |
| Comparative tire 3 | 63 | 0.55 | 0.80 | 1.45 | a | 100 |
| Tire 5 according to the present invention | 75 | 0.55 | 1.00 | 1.82 | a | 119 |
| Tire 6 according to the present invention | 75 | 0.55 | 2.20 | 4.00 | a | 128 |
| Comparative tire 4 | 60 | 0.60 | 0.80 | 1.33 | b | 102 |
| Comparative tire 5 | 60 | 0.60 | 1.00 | 1.67 | b | 102 |
| Tire 7 according to the present invention | 75 | 0.60 | 1.00 | 1.67 | b | 119 |

As is clear from the results shown in Table 2, the lateral rigidity of the beads can be further improved by rubber of a high hardness as the coating rubber, and, moreover, increasing the thickness of the reinforcing layers to a level in the range (g/d=1.45–4.0) defined in the present invention.

EXAMPLE 3

Six types of tires (Tires 8–11 according to the present invention and Comparative tires 6–7) having the same size as the tires manufactured in Example 1, and various hardnesses (JIS Hs) of the coating rubber, diameters d of the cords, thicknesses $g_1$ of the portions of the coating rubber for the reinforcing layers which were in the inner portions of the tires, thicknesses $g_2$ of the portions of the coating rubber which were in the axial outer portions of the tires, differences ($\beta$), i.e. $g_1$–$g_2$, and reinforcing structures (shown in FIGS. 4 and 5) as shown in Table 3 were manufactured, and the lateral rigidity of the beads of these tires was determined, the results being shown in Table 3.

TABLE 3

| Type of tire | Hardness of coating rubber (JIS Hs) | d (mm) | $g_1$ (mm) | $g_2$ (mm) | $\beta$ | Reinforcing structure | Lateral rigidity |
| --- | --- | --- | --- | --- | --- | --- | --- |
| Tire 8 according to the present invention | 75 | 0.55 | 0.225 | 0.225 | 0 | FIG. 4 | 119 |
| Tire 9 according to the present invention | 75 | 0.55 | 0.325 | 0.125 | 0.20 | FIG. 4 | 122 |
| Comparative tire 6 | 60 | 0.55 | 0.225 | 0.225 | 0 | FIG. 4 | 100 |
| Comparative tire 7 | 60 | 0.55 | 0.325 | 0.125 | 0.20 | FIG. 4 | 100 |
| Tire 10 according to the present invention | 75 | 0.55 | 0.225 | 0.225 | 0 | FIG. 5 | 118 |
| Tire 11 according to the present invention | 75 | 0.55 | 0.325 | 0.125 | 0.20 | FIG. 5 | 121 |

As is clear from the results shown in Table 3, the lateral rigidity of a bead can be improved greatly by using rubber of a high hardness as the coating rubber, setting the thickness of a reinforcing layer to a high level, arranging the cords, which are contained in a reinforcing layer, in such a manner that the cords are one-sided to as great an extent as possible toward the axial outer side portion of the tire, and disposing such a reinforcing layer on the axial outer side of a bead filler to form a reinforcing structure.

According to the present invention described in detail above, the hardness of the coating rubber is set to a high level, so that the steering stability of a vehicle based on the pneumatic tire can be greatly improved even by a single reinforcing layer, i.e., even when the reinforcing layer is not provided plurally since the rigidity of the reinforcing layer is increased by the hard coating rubber. Accordingly, since neither the weight of the tire nor the number of steps of manufacturing the tire is increased, the productivity of the tire can be improved, and the cost of manufacturing the same can be reduced.

What is claimed is:

1. A pneumatic tire having a bead in which an end portion of a carcass layer is bent from an axial inner portion to an axial outer portion of said tire so as to be turned up around a bead core, a single reinforcing layer which consists of reinforcing cords covered with coating rubber being provided so as to extend along a turnup portion of said carcass layer and being provided in the portion of said tire which is on the axial outer side of a neutral axis of bend of said bead and on the axial outer side of said turnup portion of said carcass layer, the hardness of said coating rubber in said reinforcing layer being set in the range of JIS Hs 65–95, a difference $\beta$ between the thickness $g_1$ of the portion of said coating rubber in said reinforcing layer which is between a cord and the axial inner edge of said reinforcing layer and the thickness $g_2$ of the portion of said coating rubber which is between said cord and the axial outer edge of said reinforcing layer being $\beta = g_1 - g_2 = 0.1$–$2.5$ mm.

2. A pneumatic tire according to claim 1, wherein the hardness of said coating rubber in said reinforcing layer is in the range of JIS Hs 75–95.

3. A pneumatic tire according to claim 1, wherein the height H of a radially outer end point of said reinforcing layer and the height SH of a cross section of said tire have the relation of H/SH=0.2–0.8, an angle of inclination of said cords in said reinforcing layer with respect to the circumferential direction of said tire being in the range of 20°–90°.

4. A pneumatic tire having a bead in which an end portion of a carcass layer is bent from an axial inner portion to an axial outer portion of said tire so as to be turned up around a bead core, a single reinforcing layer which consists of reinforcing cords covered with coating rubber being provided so as to extend along a turnup portion of said carcass layer and being provided in the portion of said tire which is on the axial outer side of an neutral axis of bend of said bead and on the axial outer side of said turnup portion of said carcass layer, the hardness of said coating rubber in said reinforcing layer being set in the range of JIS Hs 65–95, the diameter d of a cord in said reinforcing layer and the thickness g of said reinforcing layer have the relation of g/d=1.45–4.0, a difference $\beta$ between the thickness $g_1$ of the portion of said coating rubber in said reinforcing layer which is between a cord and the axial inner edge of said reinforcing layer and the thickness $g_2$ of the portion of said coating rubber which is between said cord and the axial outer edge of said reinforcing layer being $\beta = g_1 - g_2 = 0.1$–$2.5$ mm.

5. A pneumatic tire according to claim 4, wherein the hardness of said coating rubber in said reinforcing layer is in the range of JIS Hs 75–95.

6. A pneumatic tire according to claim 4, wherein the height H of a radially outer end point of said reinforcing layer and the height SH of a cross section of said tire have the relation of H/SH=0.2–0.8, an angle of inclination of said cords in said reinforcing layer with respect to the circumferential direction of said tire being in the range of 20°–90°.

* * * * *